United States Patent

[11] 3,578,177

[72] Inventor Ray Wellington Paden
    R.D. #1, Nescopeck, Pa. 18635
[21] Appl. No. 12,674
[22] Filed Feb. 19, 1970
[45] Patented May 11, 1971

[54] STORAGE RACK FOR LEVELING JACKS
    10 Claims, 6 Drawing Figs.
[52] U.S. Cl. .................................................. 211/49, 248/158
[51] Int. Cl. .................................................. A47f 7/00
[50] Field of Search .................................. 211/49, 54, 57, 119; 248/158, 161, 352; 254/98

[56] References Cited
    UNITED STATES PATENTS
    2,623,656 12/1952 Rottau ......................... 220/8
    3,021,010 2/1962 McMasters ................... 211/49
    3,388,792 6/1968 Jones ........................... 206/65
    3,493,209 2/1970 Brammer ...................... 248/352

Primary Examiner—Nile C. Byers, Jr.
Attorneys—Munson H. Lane and Munson H. Lane, Jr.

ABSTRACT: A special rack for storing a set of leveling jacks of the type including a hollow tapered stand with side openings and a top aperture removably receiving an adjusting screw. The rack consists of a base with a vertical shaft, a set of jack stands being nested on the base so that the shaft passes through the top apertures thereof and a retaining nut on the shaft serves to hold the nested stands against the base. Supporting elements for the jack adjusting screws are provided on the base around the shaft and support the screws which extend upwardly and outwardly through the side openings of the nested stands.

Patented May 11, 1971
3,578,177
2 Sheets-Sheet 1
FIG.1.
FIG.2.
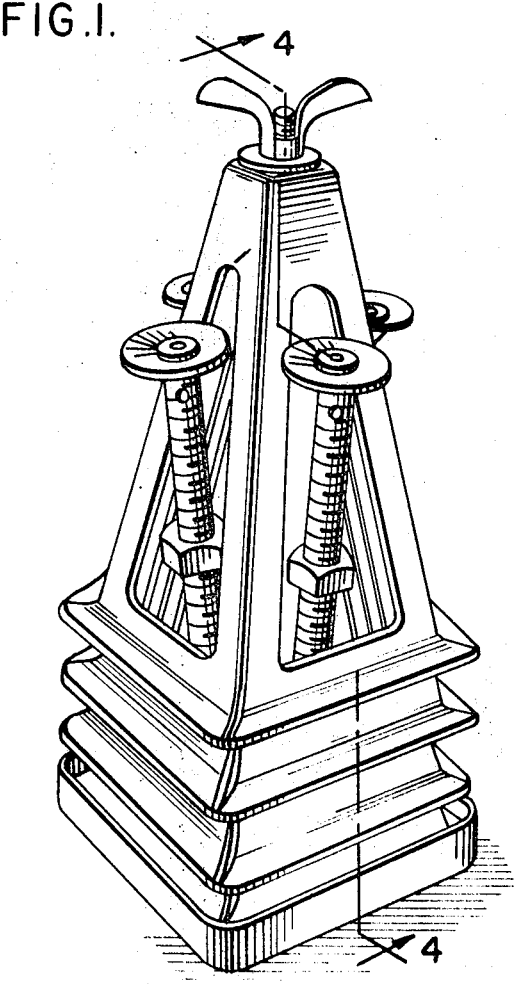
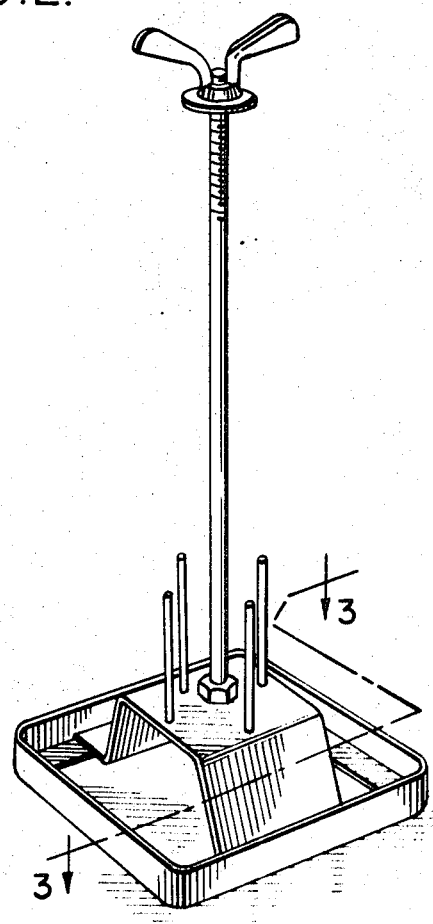
FIG.3.
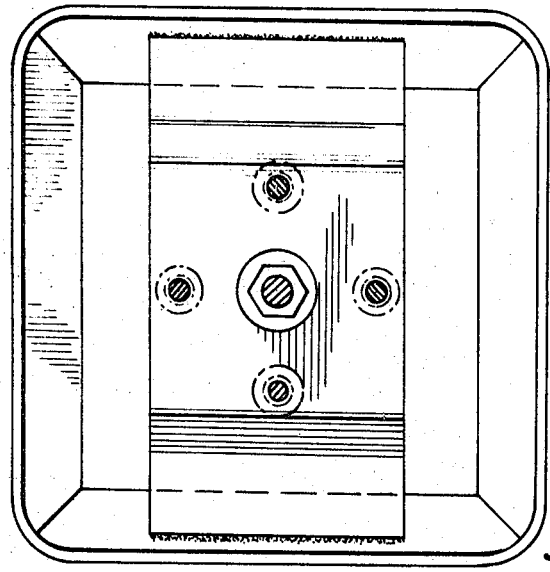
INVENTOR
RAY W. PADEN
BY Munson H. Lane
ATTORNEYS FIG.4.
FIG.5.
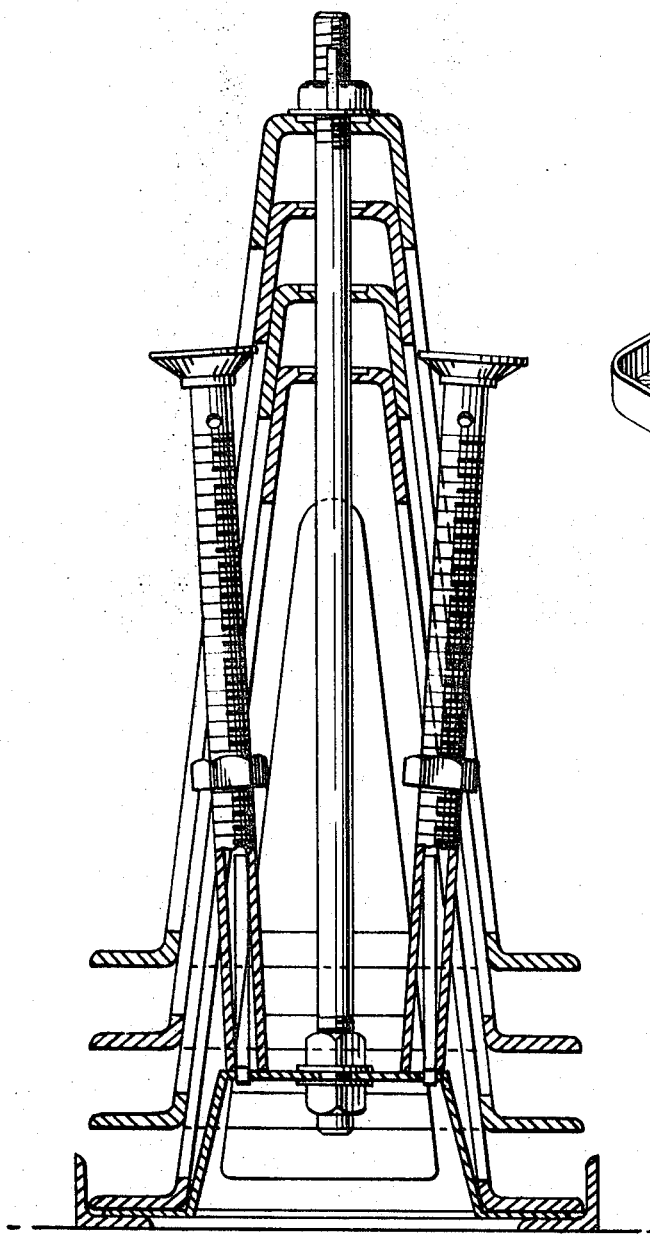
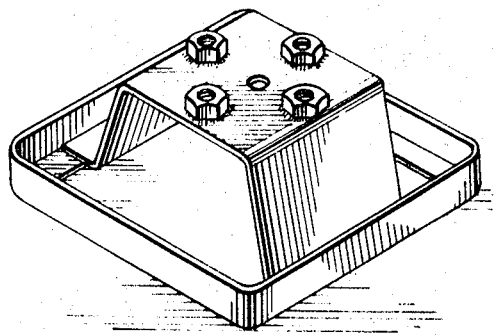
FIG.6.
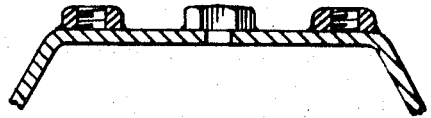
INVENTOR
RAY W. PADEN
BY *Munson H. Lane*
ATTORNEYS 3,578,177

STORAGE RACK FOR LEVELING JACKS

This invention relates to new and useful improvements in storage racks, and in particular the invention concerns itself with a rack which is especially adapted for storage of leveling jacks for house trailers and the like, while such jacks are not being used.

When house trailers, camping trailers, or the like are set up at campsites, leveling jacks are used at four corners of the trailer to level and support the same. When the trailer is to be moved to another location, the jacks are removed and are usually stored in the truck compartment of an automobile by which the trailer is towed. The four jacks in the set often become scattered in the trunk, occupy an unduly large amount of space, cause rattles while traveling and, in some instances become mislaid or lost.

It is the principal object of the invention to eliminate these disadvantages incident to conventional storage and transportation of leveling jacks when they are not is use, this object being attained by the provision of a special rack which is especially adapted to accommodate the set of leveling jacks so that as a very compact, unitary entity, the rack with the jacks may be conveniently carried and easily stored without any danger of the components becoming lost.

With the foregoing more important object and features in view, the invention will be understood from the following description taken in conjunction with the accompanying drawings in which like characters of reference are used to designate like parts, and in which:

FIG. 1 is a perspective view showing the rack of the invention accommodating a set of leveling jacks;

FIG. 2 is a perspective view of the rack per se;

FIG. 3 is a horizontal sectional view, taken substantially in the plane of the line 3—3 in FIG. 2;

FIG. 4 is a vertical sectional view, taken substantially in the plane of the line 4—4 in FIG. 1;

FIG. 5 is a perspective view showing a modified embodiment of the base of the rack; and FIG. 6 is a fragmentary vertical sectional view, taken substantially in the plane of the line 6—6 in FIG. 5.

Referring now to the accompanying drawings in detail, the special rack of the invention is shown by itself in FIG. 2 and designated generally by the reference numeral 10, while FIG. 1 shows a set of leveling jacks applied to the rack.

Before describing the construction of the rack, a brief explanation may be given of the leveling jacks with which the rack is adapted to be used. Usually, four such jacks are used, one at each corner of the trailer, each jack being of a conventional type which comprises a hollow, vertically elongated and upwardly tapered stand 12 which has an open bottom and is provided at its bottom edge with an out-turned perimetric flange 12a. The sides of the stand are formed with openings 13, mainly for reduction of weight, and the top or upper end of the stand is formed with an aperture 14 to removably receive an adjusting screw 15 having a nut 16 thereon and also having a swivel head 17 to engage the underframe of the trailer. When the jack is used, the screw 15 extends downwardly through the aperture 14 in the stand while the nut 16 engages the top of the stand, and by turning the screw relative to the nut, the screw may be raised or lowered to support the trailer at the desired level. The jack is of the knock-down type in that when it is not in use, the screw 15 may be withdrawn from the aperture 14 and thus separated from the stand 12.

The stand 10 of the invention comprises a base 18 consisting of a perimetrically flanged base member 19 and an upwardly offset platform member 20 which extends between opposite sides of and is suitably secured to the base member 18, as will be apparent from FIG. 2. A vertical shaft 21 is provided centrally on the platform member 20 and has a screw-threaded upper end portion 21' equipped with a retaining nut 22. The lower end of the shaft 21 may be welded to the platform member 20, but preferably it is also screw threaded and inserted through an aperture in the platform member and secured in position by a pair of lock nuts 23. In addition, a set of supporting elements in the form of substantially vertical rods 24 are suitably secured to the platform member 20 around the lower end portion of the shaft 21 for a purpose hereinafter described.

When a set of leveling jacks, for example four jacks, is to be stored on the rack 10, the adjusting screws 15 are removed from the apertures 14 in the top of the jack stands 12 and the nut 22 is removed from the shaft 21 of the rack. The stands 12 are then passed downwardly in succession over the shaft 21 and by virtue of their upwardly tapered, hollow form they become stacked or nested on the base 18 of the rack, as shown in FIG. 1, with the shaft 21 passing upwardly through the top apertures 14 of the several stands. The perimetrically flanged base member 19 is of a size and shape complemental to the flanged bottom portion 12a of the stands 12, so that when the several stands are nested on the base, the bottom portion 12a of the lowermost stand is accommodated in the base member 19 which thus constitutes a receptacle for that portion 12a and prevents any lateral displacement of the nested stands relative to the base. The retaining nut 22 may then be applied to the screw-threaded portion 21' of the shaft 21 to firmly hold the nested stands against the base, as will be clearly apparent.

The adjustment screws 15 of the jacks which have been removed from the apertures 14 in the stands 12 are also stored on the rack. These screws are frequently hollow and, as such they may be simply inserted inwardly and downwardly through the side openings 13 of the nested stands 12 and slid over the upwardly projecting support rods 24 on the base 18, as will be understood from FIGS. 1 and 4. The screws 15 are thus compactly accommodated on the base of the rack, while extending upwardly and outwardly through the side openings 13 of the nested stands 12.

In some instances the adjustment screws 15 are solid rather than hollow, and in such instances a slightly modified embodiment of the rack base is utilized as shown in FIGS. 5 and 6. Here the platform member 20 of the base 18a is provided with a set of nuts 25 which are welded to the platform member 20 around the central aperture 26 which receives the shaft 21, the nuts 25 being used in place of the aforementioned rods 24 in the embodiment of FIGS. 1—4. After the jack stands have been nested and secured on the base as already described, the solid adjustment screws are simply passed inwardly and downwardly through the side openings of the stands and are screwed into their respective supporting nuts 25.

I claim:

1. A storage rack for a set of leveling jacks which consist of a hollow upwardly tapered stand with side openings and a top aperture and an adjusting screw removably positionable in said aperture; said storage rack comprising a base, a vertical shaft secured to said base and having a screw-threaded upper end portion, said base being adapted to have a set of jack stands nested thereon with said shaft passing through the top apertures of the stands, a retaining nut provided on the screw-threaded upper end portion of said shaft for holding the nested stands against said base, and a set of elements provided on said base around the lower end portion of said shaft for supporting a set of jack adjusting screws while they extend upwardly and outwardly through the side openings of the nested stands.

2. The rack as defined in claim 1 together with means removably connecting said shaft to said base.

3. The rack as defined in claim 1 wherein said base comprises a perimetrically flanged base member adapted to receive therein the bottom portion of a jack stand, and an upwardly offset platform member secured to said base member, said shaft and said set of elements being mounted on said platform member.

4. The rack as defined in claim 1 wherein said elements comprise a set of substantially vertical rods secured to said base around said shaft and adapted to have slidably fitted thereover jack adjusting screws which are hollow.

5. The rack as defined in claim 1 wherein said elements comprise a set of nuts secured to said base around said shaft and adapted to receive jack adjusting screws therein.

6. The combination of a set of knocked-down leveling jacks each comprising a hollow upwardly tapered stand with side openings and a top aperture and an adjusting screw receivable in said aperture, and a storage rack for the knocked-down jacks, said storage rack comprising a base, a vertical shaft secured to said base and having a screw-threaded upper end portion, said set of jack stands being nested on said base with said shaft passing through the top apertures of the stands, a retaining nut provided on the screw-threaded upper end portion of said shaft and engaging the top of the uppermost stand for holding the nested stands against said base, and a set of elements provided on said base around the lower end portion of said shaft, said adjusting screws being supported by said elements and extending upwardly and outwardly through the side openings of the nested stands.

7. The combination as defined in claim 6 together with means removably connecting said shaft to said base.

8. The combination as defined in claim 6 wherein said base comprises a perimetrically flanged base member constituting a receptacle for the bottom portion of the lowermost stand, and an upwardly offset platform member secured to said base member, said shaft and said set of elements being mounted on said platform member.

9. The combination as defined in claim 6 wherein said adjusting screws are hollow, said elements comprising a set of substantially vertical rods secured to said base and having the hollow screws slidably fitted thereover.

10. The combination as defined in claim 6 wherein said elements comprise a set of nuts secured to said base and receiving said adjusting screws therein.